(No Model.)

S. EASTMAN.
EYEGLASS FRAME.

No. 547,879. Patented Oct. 15, 1895.

Witnesses:
M. W. Jackson
A. J. Harrison

Inventor:
Sylvester Eastman
by
Wright, Brown & Crossley,
Attys.

UNITED STATES PATENT OFFICE.

SYLVESTER EASTMAN, OF PROVIDENCE, RHODE ISLAND.

EYEGLASS-FRAME.

SPECIFICATION forming part of Letters Patent No. 547,879, dated October 15, 1895.

Application filed May 19, 1893. Serial No. 474,732. (No model.)

*To all whom it may concern:*

Be it known that I, SYLVESTER EASTMAN, of Providence, in the county of Providence and State of Rhode Island, have invented certain new and useful Improvements in Eyeglass-Frames, of which the following is a specification.

This invention has relation to means for maintaining eyeglasses on the nose of the wearer, and has for its object the provision of such improvements as will enable eyeglasses to be not only held securely on the nose in planes at right angles to the line of sight, but be maintained against displacement, and be worn without any discomfort whatever.

The invention consists of an eyeglass-frame comprising in its construction certain features which are hereinafter described with particularity and set forth in the appended claims.

Reference is to be had to the annexed drawings, and to the letters marked thereon forming a part of this specification, the same letters designating the same parts or features, as the case may be, wherever they occur.

Figure 1:
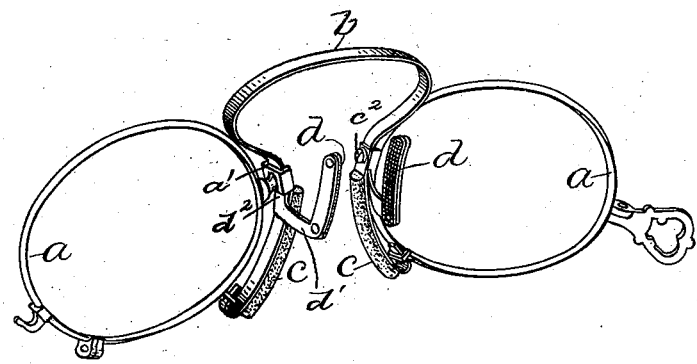
Figures 2, 3:
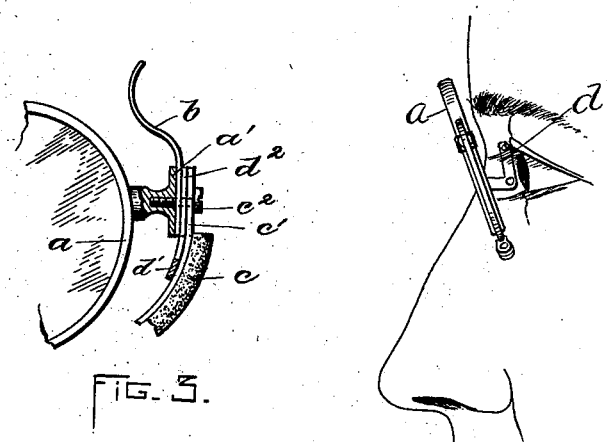

In the drawings, Figure 1 is a perspective view of an eyeglass-frame constructed in accordance with my invention. Fig. 2 is a side view of the same, representing them as on the nose of a person. Fig. 3 is an enlarged detail view, partly in vertical section, showing the ends of the bow-spring, nose-guard, and supplemental guard, where they are connected with one of the lens-frames.

*a* designates the lens-frame. *b* is the bow-spring, and *c* the nose-guards. These parts may be of usual construction, and as so far described are common to most eyeglasses, the nose-guards *c* serving as the only means for gripping the nose and maintaining the eyeglasses in place. As the nose-guards as commonly constructed rest upon the nasal bone at a point where there is little or no muscle, and as many nasal bones are quite rounded in form at said point, the glasses are not held securely in place and are easily dislodged and moved out of proper position, and particularly is this the case if there is tendency to perspiration by the wearer. Furthermore, when the glasses are maintained in place by the nose-guards the latter usually grasp the nose so tightly as to speedily become uncomfortable and to mark the nose in an unbecoming manner. Attempt has been heretofore made to obviate these disagreeable features found in the ordinary eyeglass-frame by providing it with small round pads mounted on the ends of arms extending inward from the nose-guards, such as shown in the patent to Bausch, No. 487,876, dated July 12, 1892; but the attempt has not proved entirely satisfactory, owing to the fact that the round pads cover but a very small portion of the nose and do not act to hold the lenses in place as firmly as may be desired, while at the same time they frequently grow uncomfortable to the wearer by reason of their pressure upon the very small space covered by them. I have found that if the guards are arranged so as to extend inward and upward in order to grasp the cuticle and muscles of the nose at the junction thereof with the orbital arch of the eye, and not extend downward upon the bridge of the nose, not only is a secure support afforded for the glasses, but the same can be thus worn without any appreciable discomfort. Acting upon this knowledge I have provided my improvement, which consists of a pair of supplemental holding-guards *d*, connected with the eyeglass-frame and offset inwardly from the frame and extending from or near an imaginary line drawn across the center of both lenses, when the frame is in normal position, upwardly from said line to or near the top of the frame; or when considered with reference to the nose-guards said holding-guards are offset inwardly from the former and the frame and extend above the plane of the nose-guards, so that the said holding-guards may grasp the cuticle and muscles of the nose at the junction of the latter with the orbital arch of the eye, as is clearly shown in Fig. 2, while the nose-guards *c*, when used, may rest upon the nasal bone of the nose in a line merely as steadying means and not so as to be uncomfortable, or so as to in any way detrimentally mark the face of the wearer. The holding-guards *d* are of elongated oblong form and slightly rounded in order to render them comfortable in use, and the fact that they are offset inward and are constructed to grasp only the cuticle and muscles of the nose above the bridge, at or near the junction of the same with the orbital arch, is of essence in my invention, since otherwise the frames would not be held securely in place nor would the declared comfort be derived from their use.

The parts may be secured together in any suitable manner, but I prefer to connect them as follows: Each lens-frame $a$ is provided with a socket or plate $a'$, against which one end of the bow-spring rests. The supplemental guard is composed of a V-shaped piece of metal, to the longer part $d$ of which is secured the facing-piece, of cork or other material, which rests against the nose. The lower or horizontal part $d'$ connects the long part with a short part $d^2$, which rests against the end of the bow-spring. Against this part $d^2$ rests the upper end $c'$ of the nose-guard $c$, and the parts $b$, $d^2$, and $c'$ are secured to the socket or plate $a'$ by a screw $c^2$, the said plate preferably having side flanges to steady the parts which are secured thereto. It will be observed that the supplemental guard $d$ lies in a plane which intercepts the plane of the lens at a point below the said guard; or, in other words, the supplemental guard and the nose-guard are inclined relatively to each other. By this arrangement the supplemental guard will be substantially vertical when the head of the wearer is erect and the lens will be in planes transverse to the line of sight, which line of sight, by reason of the relationship of the nose-guard, supplemental guard, and lens, will be practically through the center of the glass when the wearer is engaged in reading. This feature of my invention is of great importance, as it is well known that unless the lens is at right angles to the line of sight the image is distorted, especially when the lens is powerful.

What I claim is—

1. An eye-glass frame comprising in its construction lens frames, a bow-spring, and holding guards, each consisting of a metallic arm extending in from the plane of the lens frames, and having an elongated part extending upward from the central longitudinal line of the lens frames, whereby said guards may grasp only the cuticle and muscles at the top of the nose at or near the junction of the same with the orbital arch, said elongated parts of the guards lying in a plane which intercepts the plane of the lens frames at a line below said guards, whereby the lenses are held in planes transverse to the normal line of sight.

2. An eyeglass frame, comprising in its construction lens frames, a bow spring, main nose guards adapted to rest on the nose, and supplemental nose guards each consisting of an arm extending in from the plane of the lens frames and having an elongated part extending upward from about the central longitudinal line of said lens frames, whereby said supplemental guards may grasp the cuticle and muscles at the top of the nose at or near the junction of the same with the orbital arch, said elongated parts of the supplemental guards lying in planes which intercept the planes of the lens frames at lines below said supplemental guards whereby the lenses are held in planes transverse to the normal line of sight.

In testimony whereof I have signed my name to this specification, in the presence of two subscribing witnesses, this 15th day of May, A. D. 1893.

SYLVESTER EASTMAN.

Witnesses:
ARTHUR W. CROSSLEY,
A. D. HARRISON.